United States Patent [19]
Saunders

[11] Patent Number: 4,975,543
[45] Date of Patent: Dec. 4, 1990

[54] ENERGY-ABSORBING TOWLINE WITH EMBEDDED ELECTRICAL CONDUCTORS AND DROGUE DEPLOYMENT SYSTEM INCLUDING SAME

[75] Inventor: Roger I. Saunders, Hollis, N.H.

[73] Assignee: Sanders Associates, Inc., Nashua, N.H.

[21] Appl. No.: 373,425

[22] Filed: Jun. 30, 1989

[51] Int. Cl.$^5$ .......................... H01B 7/06; F41J 9/10; B60D 1/18; B63B 21/56
[52] U.S. Cl. ........................ 174/69; 57/216; 57/225; 114/253; 174/131 A; 244/3; 280/480
[58] Field of Search .............. 174/69, 101.5, 108, 174/113 C, 131 A, 131 B; 57/216, 220, 222, 225, 230, 237; 114/244, 245, 247, 253, 254; 191/12 R; 244/1 TD, 3, 33, 115; 267/69; 280/480; 340/852; 367/20, 130, 144, 154, 177; 440/34

[56] References Cited

U.S. PATENT DOCUMENTS

| | | | |
|---|---|---|---|
| 1,627,255 | 5/1927 | Smith | 57/225 |
| 1,899,477 | 2/1933 | Phelps | 57/216 X |
| 1,978,591 | 10/1934 | Meiwald | 174/113 C X |
| 2,389,132 | 11/1945 | Borgelt | 244/3 |
| 2,407,634 | 9/1946 | DuPont | 244/3 |
| 2,418,192 | 4/1947 | Peirce | 114/253 |
| 2,456,015 | 12/1948 | Orser | 244/3 X |
| 2,488,527 | 11/1949 | Dutcher | 174/69 |
| 2,759,990 | 8/1956 | Bean | 174/113 C X |
| 2,852,834 | 9/1958 | Engelhard | 57/225 X |
| 3,014,087 | 12/1961 | Kaplan | 174/69 |
| 3,048,078 | 8/1962 | Kaplan | 174/69 X |
| 3,058,692 | 10/1962 | Madden, Jr. | 244/3 |
| 3,126,442 | 3/1964 | Roberts | 174/69 |
| 3,327,968 | 6/1967 | Converse | 244/3 |
| 3,823,253 | 7/1974 | Walters et al. | 174/69 |
| 4,059,951 | 11/1977 | Roe | 57/230 |
| 4,097,686 | 6/1978 | Gladenbeck et al. | 174/113 C X |
| 4,317,000 | 2/1982 | Ferer | 57/230 X |

Primary Examiner—Laramie E. Askin
Attorney, Agent, or Firm—Nutter, McClellen & Fish

[57] ABSTRACT

An energy-absorbing towline (14) comprises an elastomeric core (16) having a set of internal polymeric strands (18) helically wound around the outer surface (20) of the core in a first direction and a set of external polymeric strands (22) helically wound around the outer surface (24) of the internal strands in a direction opposite to the first direction. There may be more internal strands than external strands in order to maintain torque balance as the cable elongates. Each of the internal and external strands consists of a plurality of filaments (30), and each external strand (22) may have fewer strand filaments than each internal strand (18) so as to aid in torque balancing. Electrical conductors (26) may be helically disposed between turns of the external or the internal strands. When the towline experiences tension, the elastomeric core elongates, as do the helixes. But the diameters of the helixes contract, so the strands themselves do not elongate. Consequently, the towline can elongate in response to tension and thereby absorb energy without placing any significant tensile stress on the electrical conductors used for electrical communication between a moving craft and a deployed drogue.

17 Claims, 1 Drawing Sheet

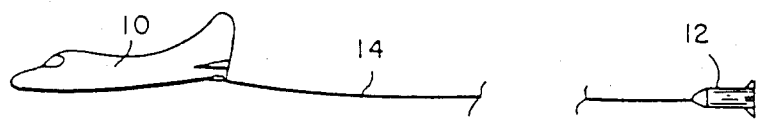
FIG. 1
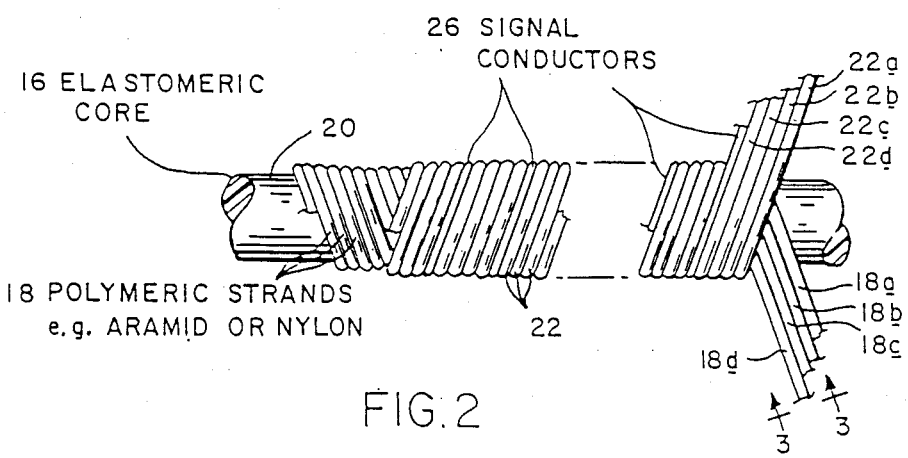
FIG. 2
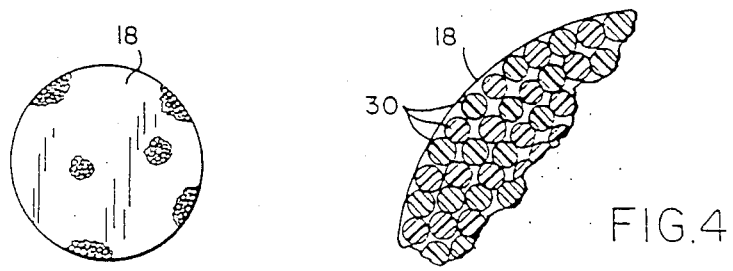
FIG. 3
FIG. 4

ENERGY-ABSORBING TOWLINE WITH EMBEDDED ELECTRICAL CONDUCTORS AND DROGUE DEPLOYMENT SYSTEM INCLUDING SAME

The present invention relates to towlines used to tow objects behind moving craft or vehicles while enabling signal communication between same and to a drogue deployment system utilizing a towline.

BACKGROUND OF THE INVENTION

As used herein the term "drogue" is intended to refer to any object capable of being, or intended to be, towed behind a moving vehicle (such as but not limited to an aircraft, boat or automobile) and configured to be resistive to the medium or media (such as but not limited to the atmosphere or the sea or other fluid) in which such object is disposed. One method for rapidly deploying a drogue from a moving craft or vehicle is to allow the deployed drogue to fall freely away from the moving craft while slowing due to the influence of drag. At the point at which the deployment of the towline connecting the moving craft to the drogue is completed, the towline immediately reaccelerates the drogue to the moving craft's speed. The resulting sudden high tension on the towline ("snap tension"), however, usually causes it to break. Consequently, brake systems have been used to slow the deployment gradually rather than stop it suddenly.

Although these brake systems reduce towline breakage, they do have several shortcomings. First, they deploy drogues at a rate substantially lower than that of a drogue freely falling to the correct deployment distance. Second, since such a system requires spinning reels and other associated machinery, it occupies much of the very limited space within the craft. Finally, such machinery makes brake systems particularly costly to build and maintain.

SUMMARY OF THE INVENTION

A primary object of the present invention is a towline construction that can be employed in a brakeless deployment system without breaking under the tension that results when the towline reaches its full deployment distance.

Another object of the invention is to provide a strong, resilient line capable of enabling electrical communication between two objects notwithstanding any strain applied to such line such as by those tow objects.

A towline constructed according to this invention has an elastomeric core with a set of internal strands helically wound around the core in a first direction and a set of external strands wound around the outer surface of the internal strands in a direction opposite to the first direction. In accordance with certain aspects of the invention, each of the internal and external strands can consist of a plurality of filaments. Signal conductors may be helically disposed between turns of the external or the internal strands. Preferably, the number of external strands is lower than the number of internal strands so as to achieve torque balance on the drogue.

When the towline experiences tension, the elastomeric core elongates, the diameters of the helixes contract, and the helixes elongate. This results in enhanced energy dissipation because of the friction that occurs between the strands as they pivot to more-axial orientations. Although the helixes elongate, the strands themselves do not elongate. Consequently, the towline of the present invention can elongate in response to tension and thereby absorb energy without placing any significant stress on conductors included parallel to the strands for communication between the moving craft and the deployed drogue.

Moreover, the resultant elongation can be significant in such a towline so that the re-acceleration occurs over a relatively long distance and the towline load can thereby be kept low enough to prevent towline breakage without the use of a brake system. Since it requires no brake system, a deployment system employing the teachings of this invention in the construction of the towline can be made to cost significantly less and require less space than a brake-type deployment system does. Furthermore, the drogue deployment time in such a system can be lower than in brake-type systems because the drogue can fall freely until its deployment distance equals the no-load length of the towline.

BRIEF DESCRIPTION OF THE DRAWINGS

The above and further advantages of the invention may be better understood by referring to the following description in conjunction with the accompanying drawings, in which:

FIG. 1 is a view of an aircraft towing an aerial drogue;

FIG. 2 is a side view, partially broken away, of the aerial towline in FIG. 1;

FIG. 3 is a cross-section in the direction of line 3—3 of an internal strand of the aerial towline in FIG. 2; and FIG. 4 is a more-detailed view of a part of the cross-section depicted in FIG. 3.

DETAILED DESCRIPTION OF ILLUSTRATIVE EMBODIMENTS

FIG. 1 depicts an that aircraft 10 that has ejected a towed object 12 such as an aerial drogue. As used herein, the term "drogue" is intended to refer to any object capable of being, or intended to be, towed behind a moving vehicle (such as but not limited to an aircraft, boat or automobile) and configured to be resistive to the medium or media (such as but not limited to the atmosphere or the sea or other fluid) in which such object is disposed. Towed object 12 includes electrical apparatus (such as a transmitter or receiver or both) preferably requiring signal and/or power communication between the aircraft 10 and the object. As it falls away from the aircraft 10, the drogue causes an interconnecting energy-absorbing towline 14 to pay out from the aircraft. When the aerial drogue 12 has extended the towline to its unstretched length, it begins to stretch the towline. As the towline 14 stretches, it gradually accelerates the drogue 12 to the aircraft's speed. In so doing, it avoids the high snap tension which would result from using an inelastic towline, because the drogue or other object 12 speed change occurs over a relatively large distance and so requires a relatively small force. A towline built according to the teachings of the present invention can thus be used in a brakeless deployment system.

Alternatively, in lieu of aircraft 10, drogue 12 could be ejected from, and towed from, a water vehicle such as but not limited to a boat, ship, submarine or a cushion-craft. A low-flying helicopter could also be used to tow drogue 12 in or on a body of water.

FIG. 2 shows that the towline 14 has a core 16 made of a solid strand of a lightweight elastomeric material, such as rubber or polyurethane, which has a high damping factor and a high elongation factor. The towline 14 also has a plurality of internal polymeric strands 18 helically wrapped around the outer surface 20 of the core 16 in a first direction and a plurality of external polymeric strands 22 helically wrapped around the outer surface 24 of the internal strands in a second direction opposite to the first. The internal strands 18 and external strands 22 are both made of a lightweight material having a high tensile strength and a high abrasion resistance, such as nylon or aramid fibers. The internal and external strands can both be composed of filaments 30 of such material.

Because of the pre-stressing of the towline 14 during its manufacture, as described below, initial low tension does not cause the towline to elongate. As soon as the pre-stressing threshold is reached, however, elongation begins. The elastomeric core 16 and the helixes elongate, but the strands 18, 22 that make up the helixes do not. Since these strands do not elongate, the electrical or other conductors wound parallel to them undergo no significant tensile stress as the towline elongates. Consequently, these electrical or other conductors can be made of ordinary conducting material without undue concern for their tensile strength. As the towline elongates, the helixes also contract in diameter, producing equal but opposite, and thus counteracting, torques on the drogue 12. Corresponding pivoting of the helix turns with respect to each other and the core 16 dissipates by friction some of the energy resulting from the work performed in elongating the towline 14 and thereby damps towline oscillation.

As was stated above, the core 16 is pre-stressed during manufacture. The amount of this pre-stressing as well as other manufacturing parameters affect the elongation characteristics of the resulting towline 14. In manufacturing, the core 16 is first put under tension and thereby elongated. An elongation of 500% is not uncommon in this process. With the core 16 under tension, the internal 18 and external 22 strands are put under nominal tension and then wrapped around the core and the internal strands, respectively. The pitch at which these strands are wrapped—i.e., the distance between successive turns—affects the tension per unit elongation of the resulting towline. Specifically, the tension per unit elongation is greater if the pitch is greater.

In this closely wound system, the pitch of the strands usually is substantially greater than the diameter of any one strand. Therefore, a plurality of strands can be wrapped in parallel to form a plurality of axially displaced helixes in each layer. As illustrated in FIG. 2, four internal polymeric strands 18a, 18b, 18c, and 18d are helically wrapped around the core, and four external polymeric strands 22a, 22b, 22c and 22d are similarly wrapped around the internal polymeric strands 18.

FIG. 3 is a cross-section of one of the strands 18, and FIG. 4 is a more-detailed view of a part of FIG. 3. As FIG. 4 shows, each individual strand 18 consists of a plurality of individual filaments 30. The individual strands 22 are constructed in the same manner as the individual strands 18. The towline 14 is wound with more internal strands than external strands so as to achieve a torque balance so that the aerial drogue 12 does not spin when the towline is stretched. Although internal and external strands are normally constructed with the same number of filaments 30, one could make the numbers of filaments per internal and external strand different to aid in balancing towline torque.

In the preferred embodiment, the core 16 consists of five individual strands of 15 AWG rubber. Both internal strands 18 and external strands 22 are made of an aramid fiber manufactured by DuPont and sold under the trademark KEVLAR 29. The internal and external strands 18 and 22 are helically wrapped around the core at three turns per inch. The internal layer has eight individual KEVLAR 29 strands, while the external layer has six individual KEVLAR 29 strands. A plurality of signal conductors 26 are helically disposed between turns of the external strands 22. These conductors can be electrically conducting wires or optical fibers.

The illustrated embodiment has a number of advantageous physical characteristics. First, it can stretch to a length at least half again its relaxed length without breaking. Second, it normally operates with a 150-lb. tension and has a rated break strength of 250 lbs. Third, it has a low damping factor of not more than six cycles. Finally, the towline has a small allowable bend radius, which allows it to be stored on a small-diameter spool without suffering a substantial degradation in its physical or electrical characteristics.

The foregoing embodiment includes, as internal strands 18 and as external strands 22, both load bearing strands and conductive strands. Inclusion of both types of strands produces a stronger, lighter weight, more flexible towline that can still provide signal conduction.

The towline can also be constructed with more than two sets of strands, each set wound in an opposite direction from the previous set. This construction could enhance the damping characteristics of the towline by increasing the internal friction between layers. Torque balance can be achieved with such construction in the manner described above.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed is:
1. A drogue deployment system comprising:
   A. a towing vehicle;
   B. a towable drogue; and
   C. an energy-absorbing towline connecting the towing vehicle to the drogue, the towline comprising:
      i. an elastomeric core;
      ii. a plurality of closely wound internal strands helically wound around the outer core surface of the elastomeric core in a first direction; and
      iii. a plurality of closely wound external strands helically wound around the outer surface of the internal strands in a second direction opposite to the first direction.
2. A system as defined in claim 1 wherein the towline further comprises a helical signal conductor disposed between turns of the internal strands.
3. A system as defined in claim 1 wherein the towline further comprises helical electrical conductor disposed between turns of the internal strands.
4. A system as defined in claim 3 wherein the electrical conductor provides electrical communication between the towing vehicle and the drogue.

5. A system as defined in claim 1 wherein the towline further comprises a plurality of helical signal conductors disposed between turns of the external strands.

6. A system as defined in claim 1 wherein the towline further comprises a plurality of helical electrical conductors disposed between turns of the external strands.

7. A system as defined in claim 6 wherein the electrical conductors provide electrical communication between the towing vehicle and the drogue.

8. A system as defined in claim 1 wherein each internal strand and each external strand of the towline further comprises a plurality of strand filaments.

9. A system as defined in claim 8 wherein the number of external filaments is less than the number of internal filaments so as to achieve a torque balance on the drogue.

10. The system as defined in claim 8 wherein an internal strand of the towline further comprises an electrical conductor wound together with the plurality of strand filaments thereof.

11. The system as defined in claim 8 wherein an external strand of the towline further comprises an electrical conductor wound together with the plurality of strand filaments thereof.

12. The system as defined in claim 8 wherein each external strand has fewer strand filaments than each internal strand does so as to achieve a torque balance on the drogue.

13. A system as defined in claim 1 wherein the number of external strands is less than the number of internal strands so as to achieve a torque balance on the drogue.

14. A system as defined in claim 1 wherein the core comprises a plurality of elastomeric filaments.

15. A system as defined in claim 1 wherein said internal strands and said external strands comprise loadbearing nonconductive strands and conductive nonloadbearing strands.

16. An energy-absorbing towline, comprising:
A. an elastomeric core;
B. a plurality of closely wound internal strands helically wound around the outer core surface of the elastomeric core in a first direction;
C. a plurality of closely wound external strands helically wound around the outer surface of the internal strands in a second direction opposite to the first direction; and
D. a helical signal conductor disposed between turns of the internal strands.

17. An energy-absorbing towline, comprising:
A. an elastomeric core;
B. a plurality of closely wound internal strands helically wound around the outer core surface of the elastomeric core in a first direction;
C. a plurality of closely wound external strands helically wound around the outer surface of the internal strands in a second direction opposite to the first direction; and
D. wherein, said internal strands and said external strands comprise loadbearing nonconductive strands and conductive nonloadbearing strands.

* * * * *